United States Patent
Beutler

(10) Patent No.: US 7,004,879 B2
(45) Date of Patent: Feb. 28, 2006

(54) AXLE DIFFERENTIAL WITH STAMPED CARRIER COVER PAN

(75) Inventor: Kevin Ray Beutler, Columbiaville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 103 days.

(21) Appl. No.: 10/755,962

(22) Filed: Jan. 12, 2004

(65) Prior Publication Data

US 2005/0153811 A1    Jul. 14, 2005

(51) Int. Cl.
*F16H 48/06* (2006.01)
*F16J 15/06* (2006.01)

(52) U.S. Cl. .................. 475/230; 277/593; 277/639

(58) Field of Classification Search ............ 475/220, 475/230, 248; 277/593, 596, 628, 630, 631, 277/637, 638, 639
See application file for complete search history.

(56) References Cited

U.S. PATENT DOCUMENTS

| | | | |
|---|---|---|---|
| 3,643,968 A * | 2/1972 | Horvath ................. 277/591 |
| 4,498,353 A | 2/1985 | Kitade | |
| 4,506,561 A | 3/1985 | Hayakawa | |
| 4,508,072 A * | 4/1985 | Takami et al. .......... 123/195 C |
| 4,606,238 A | 8/1986 | Ikemoto et al. | |
| 4,625,581 A | 12/1986 | Hull | |
| 4,867,461 A * | 9/1989 | Shimmell ................. 277/593 |
| 4,885,953 A | 12/1989 | Sweetland et al. | |
| 5,125,291 A | 6/1992 | Makita et al. | |
| 5,220,854 A | 6/1993 | Allart et al. | |
| 5,301,958 A * | 4/1994 | Covington ............... 277/641 |
| 5,364,109 A * | 11/1994 | Sihon ....................... 277/592 |
| 5,442,977 A | 8/1995 | Danjou et al. | |
| 5,513,603 A * | 5/1996 | Ang et al. ............... 123/90.37 |
| 5,536,023 A * | 7/1996 | Surbrook et al. .......... 277/593 |
| 5,913,547 A | 6/1999 | Fernandez | |
| 6,109,615 A | 8/2000 | Gildea et al. | |
| 6,155,135 A | 12/2000 | Gage et al. | |
| 6,354,599 B1 * | 3/2002 | Inamura ................... 277/591 |
| 6,837,498 B1 * | 1/2005 | Fluck et al. .............. 277/630 |
| 6,854,739 B1 * | 2/2005 | Schleth et al. ............ 277/642 |

FOREIGN PATENT DOCUMENTS

JP    4-25667   *  1/1992   ............. 277/639

* cited by examiner

*Primary Examiner*—Ha Ho
(74) *Attorney, Agent, or Firm*—Harness, Dickey & Pierce P.L.C.

(57) ABSTRACT

An salisbury axle assembly that includes a differential gearset in a carrier housing. A housing cover is coupled to the carrier housing and is operable for sealingly closing a window on the carrier housing through which there is access to the differential gearset. The housing cover includes a cover member and a seal ring. The cover member includes a mating face and a plurality of raised connection points that are disposed between the carrier housing and the mating face The seal ring is coupled to the mating face and encircles each of the raised connection points. The seal ring further includes at least first and second ring members that are disposed between each of the raised connection points. The pre-attach seal ring sealingly engages the carrier housing and the mating face to a proper compression distance.

15 Claims, 3 Drawing Sheets

AXLE DIFFERENTIAL WITH STAMPED CARRIER COVER PAN

FIELD

The present invention relates to a differential cover for a vehicle drivetrain assembly and further relates to a double seal ring that is pre-attached to the differential cover that also includes integral compression limiters.

BACKGROUND

A differential assembly houses a gear assembly that is traditionally configured to change a direction of a power input from a drive shaft to two half shafts. The drive shaft receives power from an engine and through a transmission, while the half shafts deliver power to the wheels from the differential assembly. With reference to FIG. 1, the differential assembly is generally indicated by reference numeral 10. A drive shaft 12 enters a differential assembly housing 14, also referred to as a carrier housing 14, at a front portion 16 of the housing 14. A gear assembly 17, or differential gear set, transfers power to a right half shaft 18a and a left half shaft 18b, which hereinafter are collectively referred to as half shafts 18. The housing 14 also has a plurality of mounting brackets 20 that are configured to secure the differential assembly 10 within the applicable subassemblies (not shown) of the vehicle (not shown).

Based on their construction, solid beam axle housings can be divided into two groups, an integral carrier, or a removable carrier. The integral carrier housing attaches directly to the rear suspension. A service cover, in the center of the housing, fits over the rear of the differential and axle assembly. When service is required, the cover must be removed and the components of the differential unit are then removed. Integral carriers are also commonly referred to as unitized or salisbury-type differentials, named after C. W. Salisbury one of the founders of Salisbury Axle Company.

A removable carrier assembly is configured so that the gearing assembly can be removed from the front of the differential housing as a unit, when the front portion of the differential housing unit is removed. With reference to rear live axles, a rear axle refers an axle mounted in the rear of a vehicle and to the rear tires. The front of the rear axle refers to the area which the driveshaft connects thereto and live denotes that the axle carries power, such as in a rear wheel drive vehicle. The typical housing of a removable carrier assembly has a cast-iron center section with axle shaft tubes pressed and welded into either side. The removable carrier assembly is sometimes called a "banjo" because of the bulge in the center of the housing. The bulge contains the final drive gears and differential gears. In appearance, the two designs of axle housing look similar except that the opening for the differential unit on a banjo axle is at the front and the rear of the housing is solid, while access to the salisbury axle is through a rear service cover.

It will be appreciated that variations of the salisbury and the banjo axles exist, such as independent front and rear axles. With an independent front or rear axle, the differential housing is mounted to the vehicle's chassis. As such, the differential housing does not move with the suspension. The half axles, however, are connected to the wheels of vehicle which are suspended. To that end, constant velocity joints are used to connect the half axles to the differential assembly and the wheel hubs so that the half axles are able to move with the suspended wheels. The differential housing remains unsuspended and secured to the applicable subassemblies of the vehicle.

With reference to FIG. 1 and FIG. 2, the housing 14 further includes a differential assembly cover 22, which attaches to a rear portion 24 of the housing 14 with a plurality of fasteners 26. The rear portion 24 defines a window 24a that provides access to the interior cavity of the housing 14. It will be appreciated that the differential assembly 10 is salisbury differential, as the cover 22 is a separate component that is releaseably connected to the rear of the housing 14. Disposed between the housing 14 and the differential assembly cover 22 is a gasket 28. The gasket 28 seals the differential assembly cover 22 to the housing. By sealing the cover 22 to the housing 14, the gear assembly contained therein is protected from the regime in which it is installed. The cover 22 also forms a sealed volume of space in which the gear assembly is constantly lubricated.

It will be appreciated that the gasket 28 must be placed over the housing 14 in a proper orientation to ensure proper installation when the cover 22 is secured to the housing 14. It will be further appreciated that misalignment of the gasket 28 may lead to improper sealing of the gasket 28, which may manifest itself in leaks from the housing 14. Misalignment may also cause the gasket 28 to be pinched or crimped by the fasteners 26 when the cover 22 is secured to the housing 14. The pinched or crimped gasket 28 may also improperly seal when the cover 22 is secured to the housing 14.

When the cover 22 is secured to the housing 14, the fasteners 26 must be secured so as to apply a clamping force about the perimeter of the cover 22. The clamping force causes the gasket 28 to compress and thus form a seal between the cover 22 and the housing 14. The gasket 28 not only serves to retain the internal lubrication of the differential assembly 10, but also protects the differential assembly from the regimes of driving environment, such as water, salt, and dirt. It will be appreciated that the axle of a vehicle is located along the underbelly of the vehicle and by the very nature of its location is exposed to not just water, salt, and dirt as mentioned above but may also be exposed to high-pressure water from conventional car washes. It will be appreciated that the gasket 28 must not only seal the lubrication in the differential assembly, it must also keep many things out of differential assembly, so water, dirt, salt and the like does not pollute the lubrication.

To that end, an incorrect amount of clamping force applied to the cover 22 may lead to improper sealing of the gasket 28. Over-tightening the fasteners 26, for example, may generate too much clamping force and over compress the gasket 28, such that the gasket 28 may bulge or kink, which is sometimes referred to as coining. Coining and over-compression in general may lead to leaks especially when the gasket expands and contracts due to heating and cooling the assembly 10.

It is desirable, therefore, to secure the differential assembly cover to the housing without a separate compression limiting device. It is further desirable to have the compression limiting device pre-configured into the differential assembly cover. It is also desirable to have a seal pre-attached to the differential assembly cover that is cost-effective and robust. It is additionally desirable to avoid the steps of aligning the gasket while securing the differential assembly cover to the housing.

SUMMARY

An axle assembly that includes a differential gearset in a carrier housing. A housing cover is coupled to the carrier housing and is operable for sealingly closing a window on the carrier housing through which there is access to the differential gearset. The housing cover includes a cover member and a seal ring. The cover member includes a mating face and a plurality of raised connection points that are disposed between the carrier housing and the mating face. The seal ring is coupled to the mating face and encircles each of the raised connection points. The seal ring further includes at least first and second ring members that are disposed between each of the raised connection points. The seal ring sealingly engages the carrier housing and the mating face.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description, the appended claims, and the accompanying drawings, wherein:

DETAILED DESCRIPTION

The following description of the various embodiments is merely exemplary in nature and is in no way intended to limit the invention, its application, or uses.

Figure 1:
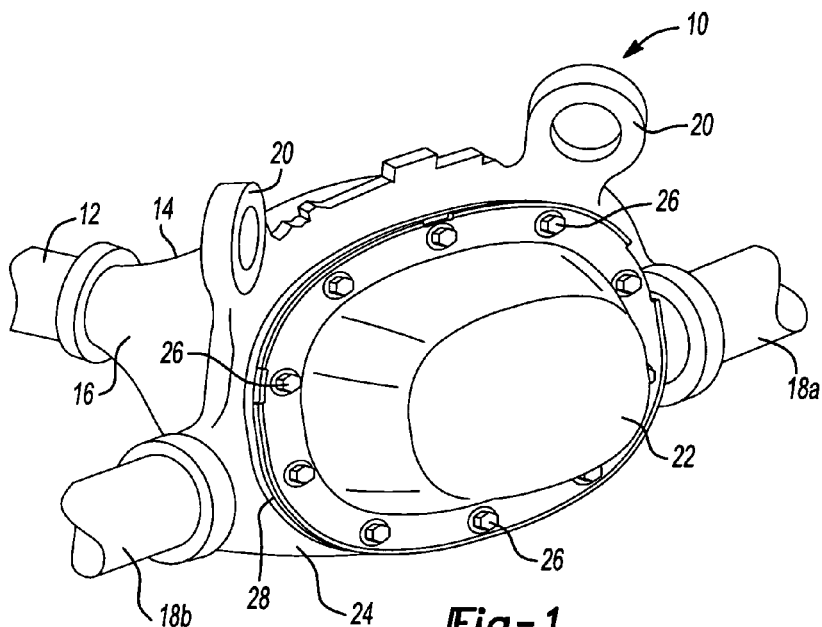
FIG. 1 is a portion of an environmental view of a prior art differential assembly showing a differential assembly cover.
Figure 4:
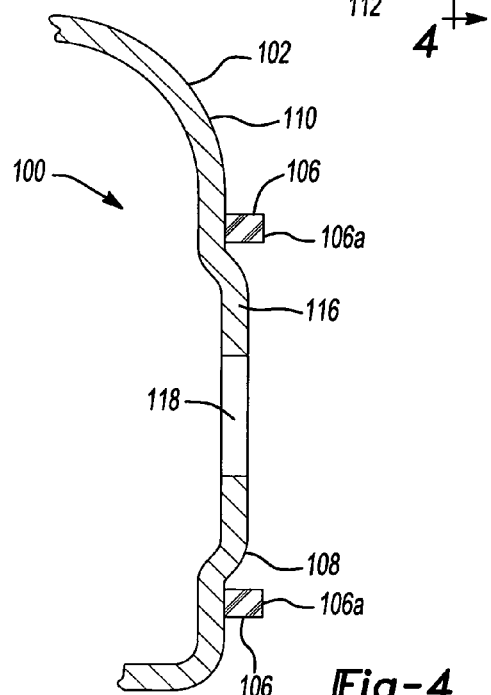
FIG. 4 is a cross-section of FIG. 5.

With reference to FIG. 4, a differential assembly cover is generally indicated by reference numeral 100. The cover 100 has a bowl portion 102 that can be configured to surround a portion of the gear assembly 17 (FIG. 1) contained in the differential assembly housing 14, as shown in FIG. 1. When the cover 100 is secured to the housing 14 (FIG. 1), the gear assembly 17 (FIG. 1) inside is not only protected from the elements outside of the housing 14 (FIG. 1) but is also sealed inside with lubrication. A modified conventional drain plug 104 can be integrated into the cover 100.

A seal ring 106 encircles a perimeter 108 of the cover 100. The perimeter 108 of the cover 100 includes a cover mating face 110. The seal ring 106 is connected to the cover mating face 110, which encircles the bowl portion 102, such that when the cover 100 is attached to the housing 14 (FIG. 1), at least the bowl portion 102 is sealed from the outside.

The seal ring 106 may include at least a first sealing member 112 and a second sealing member 114 that may be approximately concentric with the first sealing member 112. The seal ring 106 can also include a web member (not shown) that connects the first sealing member 112 to the second member 114. It will be appreciated that either the first sealing member 112 and/or the second sealing member 114 may be individually applied or connected to the cover mating face 110 directly or as an assembly incorporating the web member (not shown) therebetween.

In the various embodiments of the present invention, the sealing ring 106 is attached to the cover mating face 110 with a suitable adhesive. It will be appreciated that when the cover 100 is secured to the housing 14 (FIG. 1) there is no need to align a separate gasket as the sealing ring has already been affixed to the cover mating face 110 in the proper orientation. It will be further appreciated that the sealing member can contain one sealing member or a plurality of sealing members.

Figure 3:
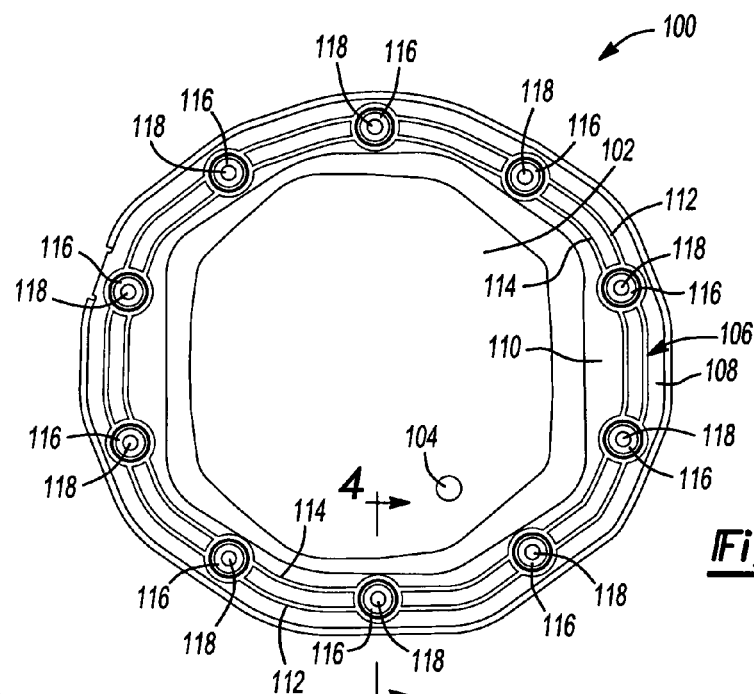
FIG. 3 is a differential assembly cover constructed in accordance with the various embodiments of the present invention showing a double-beaded seal and a plurality of raised connection points.

The cover 100 also includes a plurality of raised connection points 116. The plurality of raised connection points 116 are integral to the cover mating face 110 and define a plurality of apertures 118 within the connection points 116 spaced along the perimeter 108 of the cover 100. In the various embodiments, there are ten (10) connection points 116 that are approximately equally spaced apart from one another. It will be appreciated, that while ten (10) connection points 116 are depicted in FIG. 3, more or less connection points 116 can be used as size, geometry, and sealing requirements change in a given application.

Figure 5:
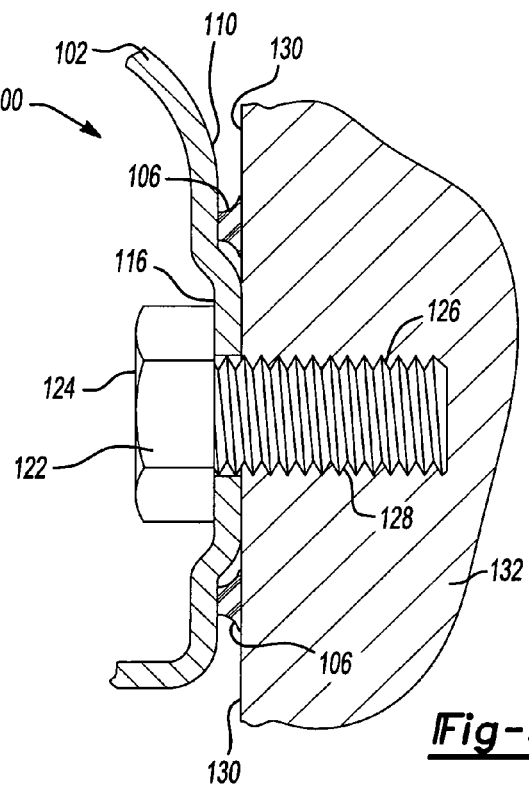
FIG. 5 is an assembly view showing the differential assembly cover secured to the differential assembly housing and the gasket compressed therebetween.

The seal ring 106 encircles each connection point 116 so that a continuous seal is formed around the bowl portion 102 of the cover 100. It will be appreciated that the raised connection point 116 is at a different elevation than a portion of the cover mating face 110 adjacent to the raised connection point 116, as shown in FIGS. 4 and 5. To that end, the seal ring 106 encircles each connection point 116 but the sealing ring 106 is otherwise mounted to the cover mating face 110 at a lower elevation when compared to the elevation of the connection point 116. In the various embodiments, the distance in the elevation between each of the raised connection points 116 and an end 106a of the seal ring 106 opposite face 110 is referred to as the compression distance.

Figure 2:
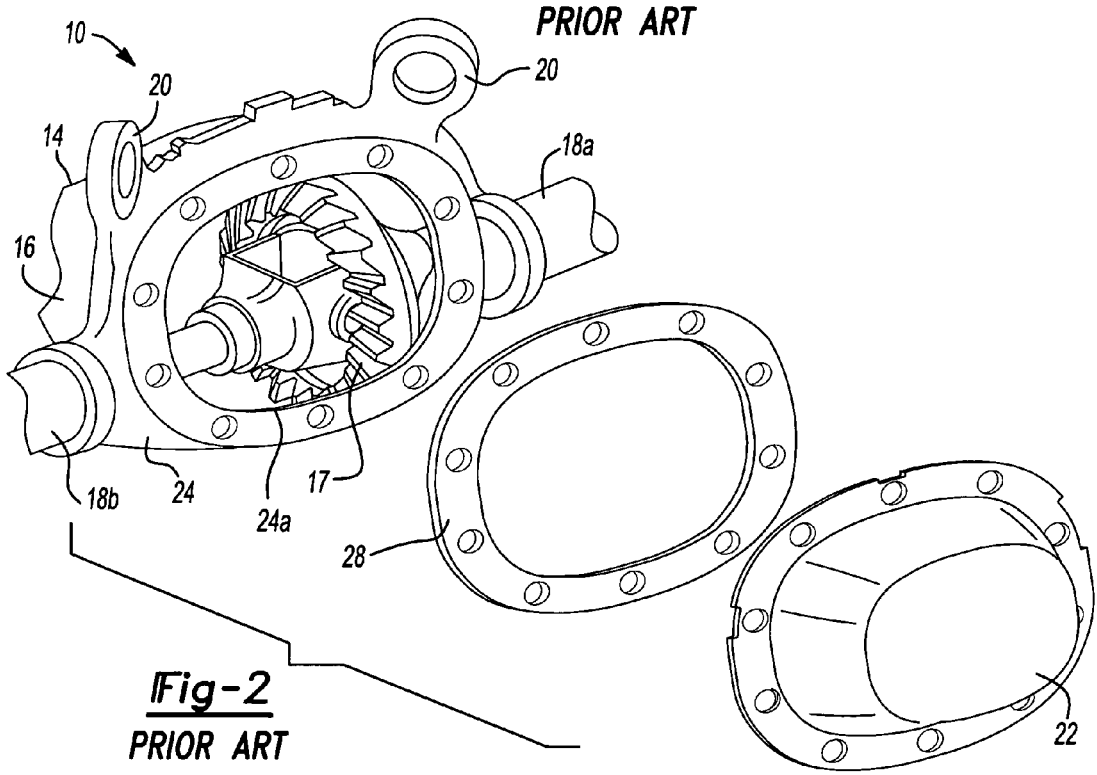
FIG. 2 is an exploded assembly view of the differential assembly of FIG. 1 showing the differential assembly cover, a gasket, and a differential assembly housing.

In the various embodiments, the cover 100 can be stamped as one piece. The stamping process creates, among other things, the bowl portion 102, the raised connection points 106, and the cover mating face 110 along with the general geometry of the bowl. Moreover, the sealing ring 106 can be affixed to the cover 100 during the stamping process, so that the cover 100 and the seal ring 106 can be produced as a single unit. This can not only eliminate the need to match the cover 100 to the gasket 28 (FIG. 2), this can also reduce production time, part cost and inventory control issues.

With reference to FIG. 4, a portion of the cross-section of the cover 100 is shown with the seal ring 106 encircling the raised connection point 116. A segment of the bowl portion 102 connects with the cover mating face 110. Each of the apertures 118 is formed within each of the raised connection points 116. It will be appreciated that the seal ring 106 is shown in an uncompressed state in FIG. 4, and in a compressed state in FIG. 5.

With reference to FIG. 5, a fastener 122 is shown having a head 124 and a threaded shank 126 that is at least partially inserted within a threaded aperture 128. A plurality of fasteners 122 secure the cover 100 to a housing mounting face 130 of a housing 132. It will be appreciated that the raised connection point 116 makes direct contact with the housing mounting face 130 and by virtue of the geometry of the cover 100, the seal ring 106 is compressed to a desired distance. In the various embodiments, the desired distance to compress the seal ring 106 between the cover mating face 110 and the housing mounting face 130 may be the compression distance.

In the various embodiments, the housing 132 can be a salisbury differential housing, wherein the cover 100 is a modified housing cover configured to secure to a salisbury differential housing. The cover 100 may also be modified to seal to an axle assembly configured with independent suspension or to various transaxles. Moreover, the cover 100 can also be used in other areas of the vehicle beyond its use on front or rear axles.

The cover 100 is placed over the housing 132 and secured to the housing with the plurality of fasteners 122. It will be appreciated that when the apertures 118 of the connection points 116 are aligned with the housing mounting face 130, the seal ring 106 is necessarily aligned properly to the housing 132. The plurality of fasteners 122 are then used to secure the cover 100 to the housing 132. When the fasteners 122 are secured, the configuration of the cover 100 is such that the seal ring 106 is properly compressed between the cover mating face 110 and the housing mounting face 130. As such, the seal ring 106 can be compressed by an amount equal to the compression distance between the cover mating face 110 and the housing mounting face 130, while the connection points 116 make direct contact with the housing mounting face 130.

It will be appreciated that a proper seal between the housing cover 100 and the differential housing 132 is required to not only contain lubrication within the differential housing 132 but also keep out the many pollutants to which the exterior of the differential housing is exposed. Some of the pollutants, for example, include water, salt spray, dirt, oil, and the like. Moreover, axle assemblies are commonly exposed to high-pressure wash systems or driven through water both of which can add to the need to have a robust seal between the housing cover 100 and differential housing 132.

Figure 6:
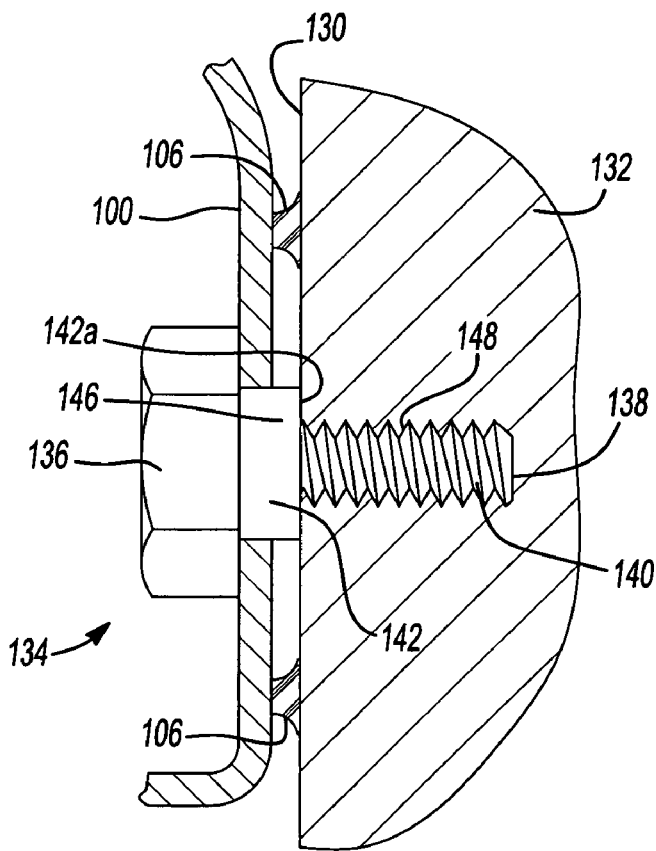
FIG. 6 is another assembly view showing a shoulder bolt securing the differential assembly cover to the differential assembly housing with the gasket in a compressed state.
Figure 7:
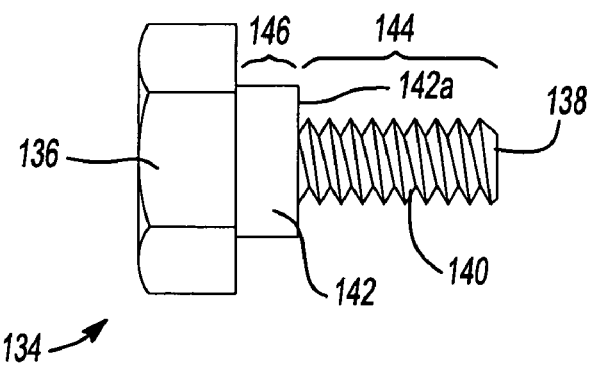
FIG. 7 is a side view of the exemplary shoulder bolt of FIG. 6.

Other devices can be employed to address compression of the seal ring 106 a proper distance or put another way to limit compression. Any such device must not only be robust, easy to use, and compliant with other materials, it must also be cost effective in a mass production scale. FIG. 6 depicts a portion of the cover 100 using a shoulder bolt, which is generally indicated by reference numeral 134. The shoulder bolt 134 has a head 136 from which a shank 138 extends. The shank 138 has a threaded-portion 140 and a non-threaded-portion 142, which is located between the threaded portion 140 and the head 136. The length of the shank 138 includes a length of the threaded-portion 140 and a length of the non-threaded-portion 142, which are indicated by reference numerals 144 and 146, respectively, a shown in FIG. 7. It will be appreciated that the threaded portion 140 has a smaller diameter than the non-threaded portion 142, such that the end of the non-threaded portion 142, adjacent to the threaded portion 140, generally forms a shoulder 142a.

The shoulder bolt 134 can be inserted into a threaded aperture 148 or a conventional nut. It will be appreciated that the shoulder bolt 134 can only be inserted a distance 144 into the threaded aperture 148. As shown in FIG. 6, the shoulder bolt 134 is inserted through the differential assembly cover 100 and the housing 132. The shoulder bolt 134 is then secured into the threaded aperture 148. It will be appreciated that the shoulder bolt 134 compresses the cover 100 against the housing 132 enough to properly clamps the seal ring 106 therebetween. As such, the shoulder bolt 134 limits the compression of the seal ring 106 as the shoulder bolt 134 can only be inserted the distance 144 into the threaded aperture 148.

In lieu of the shoulder bolt 134, a compression limiter (not shown) may be introduced between the cover 100 and the housing 132 to establish a proper compression distance for the seal ring 106. In various embodiments, a compression limiter may take the form of a sleeve (not shown) over a conventional fastener, which may be used to limit the insertion of the fastener. While introducing compression limiters may be a less expensive option than using shoulder bolts, compression limiters add to the overall parts count of the assembly and can increase the overall cost of the process.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An axle assembly comprising:
   a differential gearset;
   a carrier housing defining a cavity and a window that permits access to the cavity, the differential gearset being disposed in the cavity;
   a pair of half shafts coupled to the differential gearset and extending from the carrier housing; and
   a housing cover coupled to the carrier housing and operable for sealingly closing the window, the housing cover including:
   a cover member having a mating face and a plurality of raised connection points that are disposed between the carrier housing and the mating face; and
   a seal ring coupled to the mating face, the seal ring encircling each of the raised connection points and including at least first and second ring members that are disposed between each of the raised connection points, wherein the seal ring sealingly engages the carrier housing and the mating face.

2. The axle assembly of claim 1, wherein the raised connection points make direct contact with a housing mounting face and limit an amount by which the seal ring may be compressed between the mating face and the housing mounting face.

3. The axle assembly of claim 2, wherein the seal ring is compressed to a compression distance between the cover mounting face and the housing mounting face.

4. The axle assembly of claim 2, further comprising a web member connected to at least the first ring member and the second ring member and connected to the housing cover.

5. The axle assembly of claim 1, further comprising the seal ring having a plurality of the ring members.

6. An axle assembly comprising:
   a differential housing adapted to house a gear assembly, the differential housing including a housing mounting face;
   a removable housing cover having a cover mating face and a plurality of fastening apertures;
   a seal ring permanently affixed to said housing cover mating face, the seal ring including at least one encircling portion that encircles each of the fastening apertures;
   a plurality of fasteners, each of the fasteners being received through an associated one of the fastening apertures and threadably engaging an aperture in the differential housing to thereby fixedly but removably couple the housing cover to the differential housing such that the seal ring is in sealing engagement with both the housing mounting face and the cover mating face; and a compression limiting member contacting the differential housing to limit an amount by which the seal ring is compressed between the housing mating face and the cover mating face, the compression limiting member includes a plurality of raised connection points formed on the housing cover and which extend from the cover mating face.

7. The axle assembly of claim 6, wherein the seal ring includes first and second ring members, each of the first and second ring members being coupled at opposite ends to a pair of the encircling portions.

8. The axle assembly of claim 7, wherein the first and second ring members are concentric.

9. The axle assembly of claim 6, wherein the seal ring is formed from an elastomeric material.

10. The axle assembly of claim 6, wherein the compression limiting member further includes at least one of a shoulder bolt and a bolt assembly that comprises a bolt that extends through a hollow sleeve.

11. An axle assembly comprising
a housing cover configured to attach to a differential housing with a plurality of fasteners;
a plurality of raised connection points integral to the housing cover; and
a seal ring affixed to the housing cover having a plurality of concentric sealing members encircling the plurality of the raised connection points, wherein the housing cover is secured to the differential housing with the seal ring disposed therebetween.

12. An axle assembly comprising:
a carrier housing defining a cavity, a window providing access to the cavity and a housing face surface surrounding the window;
a differential gearset disposed in the cavity; and
a housing cover for enclosing the window and sealing a volume of fluid within the cavity, the housing cover including a cover member and a seal ring, the cover member having a cover face surface with a plurality of raised connection points configured to engage the housing face surface, the seal ring affixed to the cover face surface and encircling the raised connection points so as to engage the housing face surface.

13. The axle assembly of claim 12 wherein the seal ring is compressed between the housing face surface and the cover face surface.

14. The axle assembly of claim 12 wherein the seal ring includes first and second sealing members affixed to the cover face surface and which are connected to seal segments encircling the raised connection points.

15. The axle assembly of claim 12 wherein the carrier housing further includes a plurality of housing apertures formed in the housing face surface that are adapted to align with cover apertures formed in each of the raised connection points on the cover member, and wherein fasteners are installed in aligned pairs of the housing and cover apertures so as to secure the cover member to the carrier housing.

* * * * *